Jan. 4, 1944.   K. KOHL   2,338,441
ULTRA HIGH FREQUENCY CABLE
Filed Nov. 26, 1940

Inventor.
Karl Kohl.

By Allwidcombe
Attorney.

Patented Jan. 4, 1944

2,338,441

UNITED STATES PATENT OFFICE 2,338,441

ULTRA HIGH FREQUENCY CABLE

Karl Kohl, Berlin, Germany; vested in the Alien Property Custodian

Application November 26, 1940, Serial No. 367,195
In Germany October 31, 1939

4 Claims. (Cl. 178—44)

For transmitting currents of high frequency, so-called Lecher-wires have proved to be advantageous. These consist of wires or concentric lines running parallel with small spacings between the wires. A disadvantage of these lines is their comparatively large mutual capacity as well as the always existing residual radiation and the self-attenuation of the lines.

Contrary thereto, the present invention relates to a construction of an ultra high frequency cable disinguished by a particularly small attenuation and, therefore, by a long range.

The cable according to the invention is constructed as a hollow conductor for transmitting a free spatial radiation, and there are provided transverse conductors with so small mutual spacings that the transmitted ultra high frequency radiation is prevented by diffraction from entering the spaces between the transverse conductors. The length of the transverse conductors are preferably chosen so that a resonance or an optimum freeness from attenuation is obtained for the wave length transmitted.

The dimensions and the design of any set transverse conductors may be carried out in accordance with principles that are now well known in the art and that require no discussion in this specification. As transverse conductors there may be used walls of metal or metallized material. Preferably these walls have a circular or annular shape.

Figure 1:
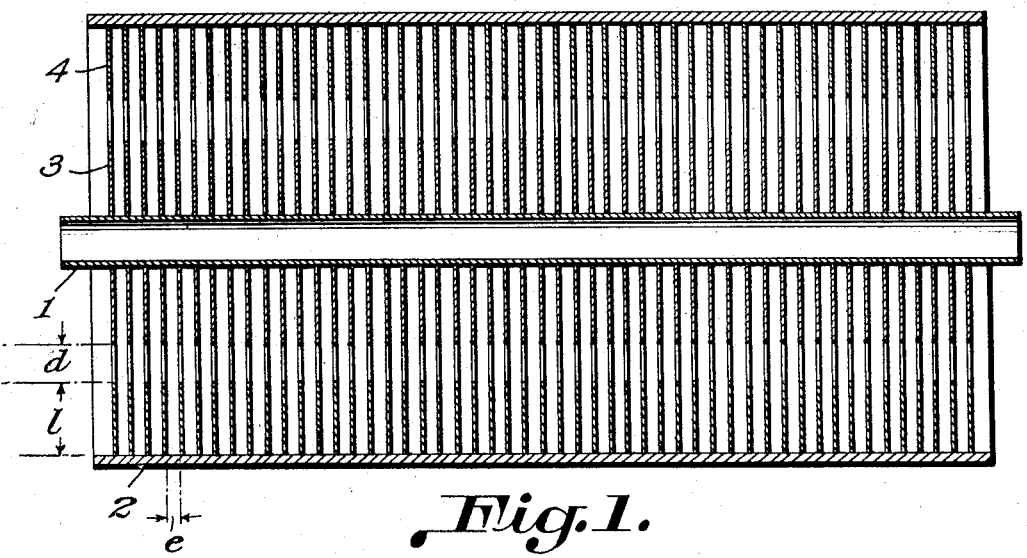
Figure 2:
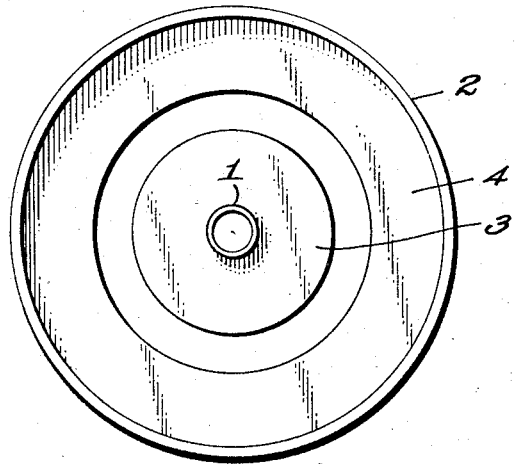

A constructional example of the invention is illustrated in the accompanying drawing, wherein Fig. 1 is a central longitudinal section of one embodiment of my invention and Fig. 2 an end view of the cable shown in Fig. 1. The drawing shows a hollow cable with conductors 1 and 2 each being completed by transverse conductors 3, facing each other. The free ends of the intermediate conductors approach each other up to the short distance $d$, which is made as small as possible in order to avoid spatial radiation losses. Also the distance $e$ between two adjoining transverse conductors is small, at least small enough to avoid a diffraction of the free spatial radiation about the free ends of the transverse conductors with respect to the wave length employed. There is an optimum value for the length of each transverse conductor, at which the latter or the while line is just in resonance and thus possesses the extreme freeness from attenuation for the ultra short waves transmitted.

The transverse conductors may be constructed as walls of metal or metallized material and may have a circular or annular shape. The partitions are connected directly with the concentric longitudinal conductors 1, 2.

For the transmission of a free spatial radiation it is advisable to make the free inner diameter $d$ equal to $\frac{1}{2} \lambda$ (i. e. wave length) or equal to even (i. e., wave length) or uneven multiples of $\frac{1}{2} \lambda$.

The wave radiated into the free inner space from one end is confined by the conductive covering with the transverse walls 3. The entire arrangement acts as a radiation director.

The invention is not restricted to the constructional example illustrated, but is also applicable in the case of cables of other construction, for example in a cable with two conductors.

What is claimed is:

1. An ultra high frequency cable comprising concentrically spaced hollow inner and outer conductors, each conductor having radially extending closely spaced metallic annular discs, the arrangement of the discs being such that those on the inner conductor are disposed along its outer extension and the discs on the outer conductor being disposed along its inner extension, the free ends of the discs on each conductor being oppositely disposed and spaced apart, whereby the apertures thus formed between the free ends constitute an axial path for transmitting spatial radiation, each of the transversely arranged discs having a length of optimum value for resonance purposes with respect to the transmitted waves, and the lateral spacing of the discs being sufficiently close to avoid diffraction of the free spatial radiation.

2. An ultra high frequency cable as claimed in claim 1, wherein the diameter of the apertures of the spaced discs is equal to a half wave length of the transmitted radiation or a multiple thereof.

3. An ultra-high frequency cable as claimed in claim 1, wherein the radial extension of the annular discs are of such dimensions to produce a resonance and an optimum freeness from attenuation for the wave length of the spatial radiation transmitted through the axial path formed by the apertures of the discs.

4. An ultra high frequency cable as claimed in claim 1, wherein the spacing of the annular discs from one another is so close that the free high frequency spatial radiation transmitted through the wave guide is prevented from entering the small spaces between the discs.

KARL KOHL.